(12) United States Patent
Drenckhahn et al.

(10) Patent No.: US 9,502,742 B2
(45) Date of Patent: Nov. 22, 2016

(54) ELECTRICAL ENERGY STORE

(71) Applicant: SIEMENS AKTIENGESELLSCHAFT, Munich (DE)

(72) Inventors: Wolfgang Drenckhahn, Erlangen (DE); Horst Greiner, Forchheim (DE); Norbert Kellner, Kleinsendelbach (DE); Harald Landes, Rueckersdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 27 days.

(21) Appl. No.: 14/389,007

(22) PCT Filed: Mar. 19, 2013

(86) PCT No.: PCT/EP2013/055680
§ 371 (c)(1),
(2) Date: Sep. 29, 2014

(87) PCT Pub. No.: WO2013/143921
PCT Pub. Date: Oct. 3, 2013

(65) Prior Publication Data
US 2015/0056522 A1 Feb. 26, 2015

(30) Foreign Application Priority Data
Mar. 29, 2012 (DE) .......................... 10 2012 205 077

(51) Int. Cl.
*H01M 12/08* (2006.01)
(52) U.S. Cl.
CPC ..... *H01M 12/08* (2013.01); *H01M 2300/0074* (2013.01)

(58) Field of Classification Search
CPC .................. H01M 12/08; H01M 2300/0074
See application file for complete search history.

(56) References Cited

U.S. PATENT DOCUMENTS

| 5,492,777 | A | 2/1996 | Isenberg et al. | |
| 9,005,826 | B2 | 4/2015 | Landes et al. | |
| 2011/0287329 | A1 | 11/2011 | Mizuno et al. | |
| 2012/0115068 | A1* | 5/2012 | Nakanishi | H01M 12/06 429/498 |
| 2013/0034784 | A1* | 2/2013 | Landes | H01M 4/134 429/417 |
| 2013/0112569 | A1 | 5/2013 | Ise et al. | |

(Continued)

FOREIGN PATENT DOCUMENTS

| CN | 102334228 | 1/2012 |
| DE | 10 2009 057 720 A1 | 6/2011 |
| DE | 10 2010 027 690 A1 | 1/2012 |

(Continued)

OTHER PUBLICATIONS

Chinese Office Action dated Jan. 12, 2016 in corresponding Chinese Patent Application No. 201380015397.5.

(Continued)

*Primary Examiner* — Stewart Fraser
(74) *Attorney, Agent, or Firm* — Slayden Grubert Beard PLLC

(57) ABSTRACT

An electrical energy store having at least one stack with in each case at least one storage cell. Each storage cell has an air electrode, which is connected to an air supply apparatus, and a storage electrode. The storage electrode adjoins channels which contain a storage medium and a steam/hydrogen mixture. A reservoir of steam/hydrogen is provided, the reservoir being directly connected to the channels.

11 Claims, 4 Drawing Sheets

(56) References Cited

U.S. PATENT DOCUMENTS

2014/0125288 A1* 5/2014 Hanebuth ......... H01M 8/04014
                                                                                320/128
2015/0249279 A1* 9/2015 Drenckhahn ......... H01M 12/08
                                                                                429/407

FOREIGN PATENT DOCUMENTS

| DE | 10 2012 205 077.9 | 3/2012 |
| DE | 10 2011 077 692 A1 | 12/2012 |
| DE | 10 2011 078 116 A1 | 12/2012 |
| JP | 11-501448 | 2/1999 |
| JP | 2009-99491 | 5/2009 |
| JP | 2012-234745 | 11/2012 |
| JP | 2013-513910 | 4/2013 |
| WO | 2010/100749 | 9/2010 |
| WO | 2012/008266 | 1/2012 |
| WO | WO 2012/098945 A1 | 7/2012 |
| WO | WO 2012/171787 A1 | 12/2012 |
| WO | PCT/EP2013/055680 | 3/2013 |

OTHER PUBLICATIONS

X. Zhao et al., "Performance of Solid Oxide Iron-Air Battery Operated at 550° C.," *Journal of the Electrochemical Society*, vol. 160, No. 8, May 2013, pp. A1241-A1247.

H. Ohmori et al., "Numerical simulation of gas diffusion effects on charge/discharge characteristics of a solid oxide redox flow battery," *Journal of Power Sources*, vol. 208, Feb. 2012, pp. 383-390.

N. Xu et al., "A novel solid oxide redox flow battery for grid energy storage," *Energy & Environmental Science*, vol. 4, pp. 4942-4946.

X. Zhao et al., "Energy storage characteristics of a new rechargeable solid oxide iron-air battery," *RSC Advances*, vol. 2, Sep. 2012, pp. 10163-10166.

Office Action mailed Mar. 7, 2013 for corresponding German Patent Application No. 10 2012 205 077.9.

International Search Report mailed Jul. 9, 2013 for corresponding International Patent Application No. PCT/EP2013/055680.

Japanese Office Action for related Japanese Patent Application No. 2015-502209, mailed on Sep. 15, 2015, 4 pages.

Japanese Notice of Allowance, Application No. 2015502209, 3 pages, Jun. 21, 2016.

* cited by examiner

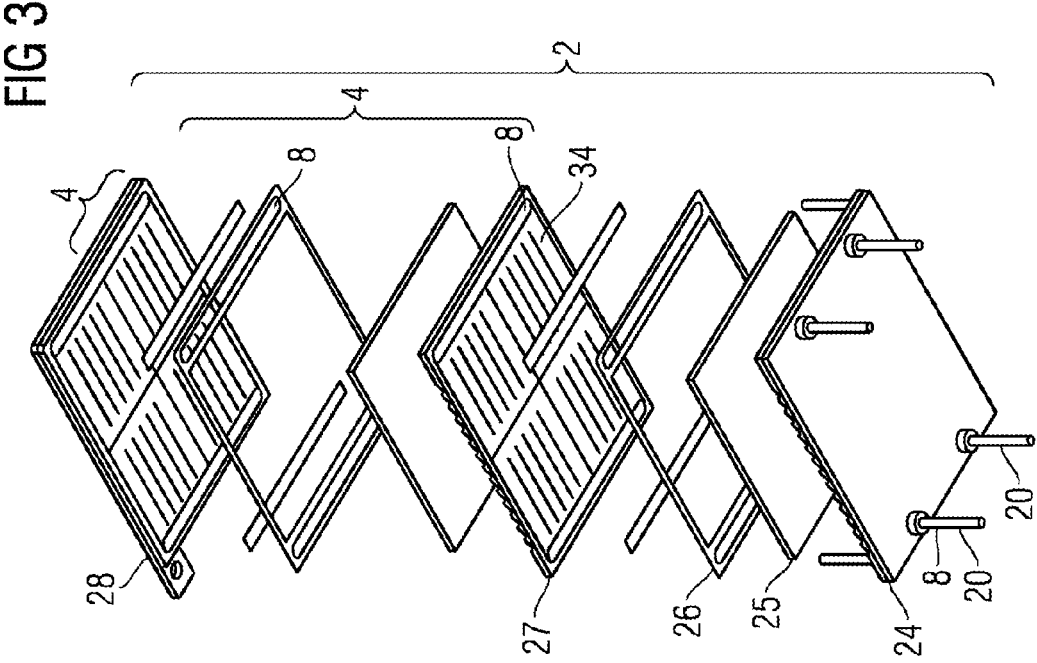
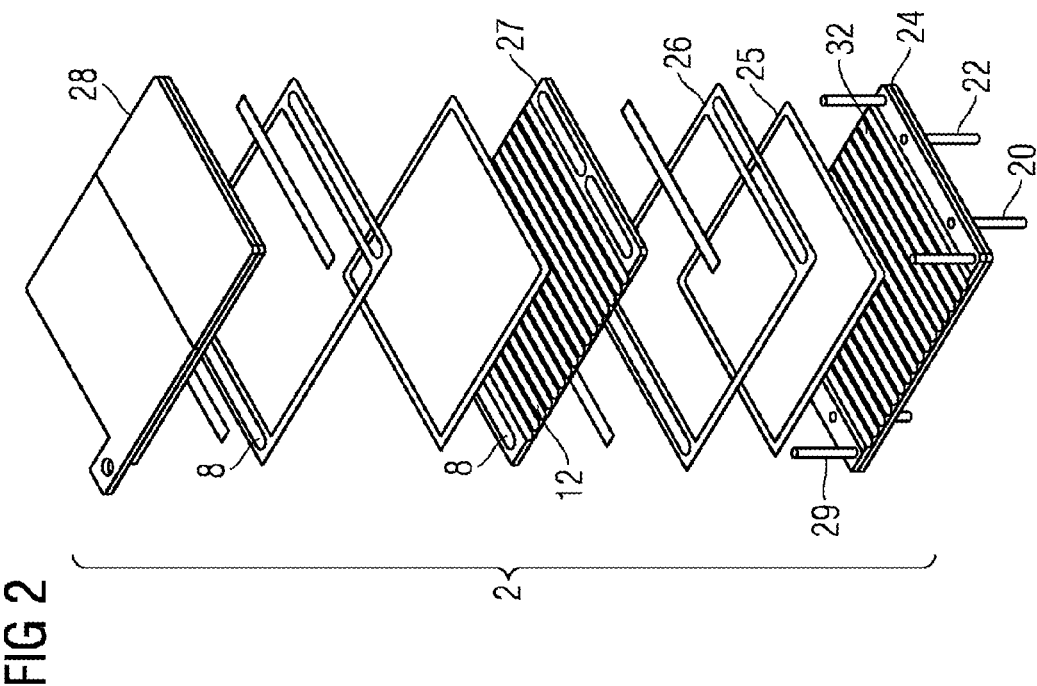

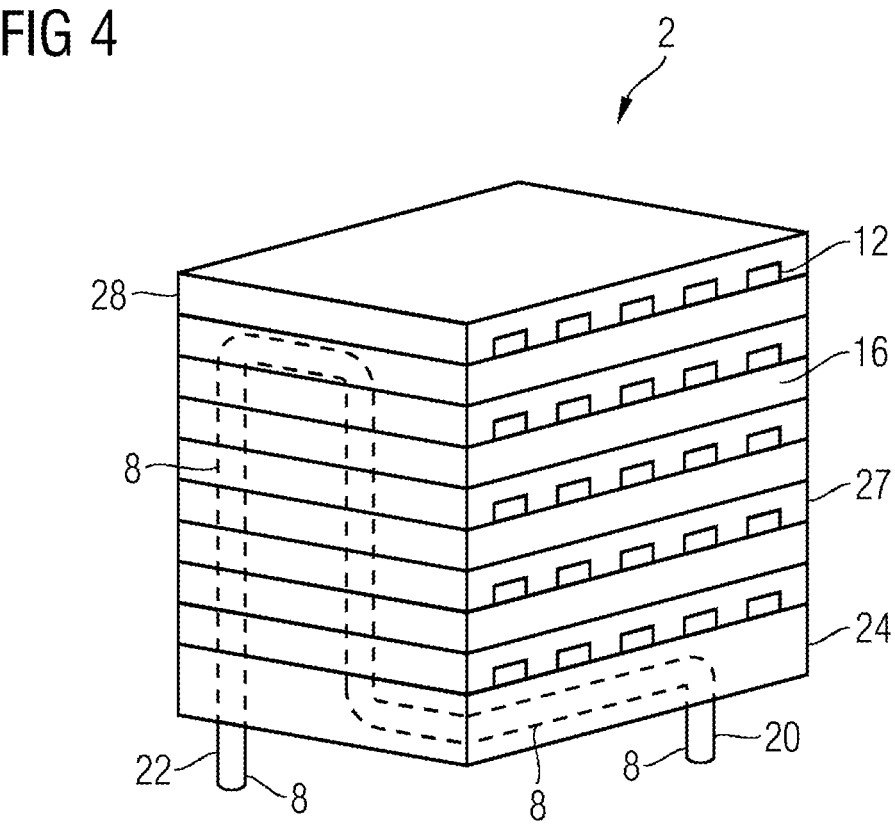

ELECTRICAL ENERGY STORE

CROSS REFERENCE TO RELATED APPLICATIONS

This application is based on and hereby claims priority to International Application No. PCT/EP2013/055680 filed on Mar. 19, 2013 and German Application No. 10 2012 205 077.9 filed on Mar. 29, 2012, the contents of which are hereby incorporated by reference.

BACKGROUND

The invention relates to an electrical energy store.

For the storage of excess electrical current, which occurs, for example, when current is generated by renewable energy sources or by power plants operated in the optimal efficiency range, and for which there is temporarily no demand in the network, various technical alternatives are adopted. One of these is the rechargeable metal air battery (rechargeable oxide battery, ROB). ROBs are usually operated at temperatures of between 600° C. and 800° C. In this case, oxygen, which is supplied at a (positive) air electrode of the electrical cell, is converted into oxygen ions, is transported through a solid electrolyte and is brought to the opposite negative electrode. A reaction with a gaseous redox pair takes place there, which absorbs or emits electrons, depending on the charging or discharging process, the oxygen absorbed or emitted by the gaseous redox pair being transferred by the diffusion of the components of the redox pair to a porous, that is to say gas-permeable, and likewise oxidizable and reducible storage medium. On account of the high temperatures required for this process, the choice of material for the cell materials used and the design of the cell parts and also the arrangement of the storage medium are highly complex. In particular, the individual components become impaired after several redox cycles which are run at said operating temperatures.

SUMMARY

One potential object, therefore, is to provide an electrical energy store, based on an ROB, which, as compared with the related art, ensures a cost-effective, simply assembled and temperature-resistant set-up of a stack or of a storage cell.

The inventors propose an electrical energy store. The electrical energy store has at least one stack each with at least one storage cell which comprises, in turn, an air electrode which is connected to an air supply device, a negative electrode and a storage medium arranged in the immediate vicinity of the latter. The negative electrode is therefore designated hereafter as the store-side electrode or, in brief, as the storage electrode. The storage electrode itself does not comprise the storage medium. Adjacent to the storage electrode are ducts which contain the porous storage medium and also a hydrogen/water vapor mixture. The composition of the latter is given, in the nonloaded state, by establishing the chemical equilibrium with the storage material and, during charging and discharging, will deviate from this to a greater or lesser extent, depending on the load. The proposed energy store is distinguished in that a reservoir having a water vapor/hydrogen mixture is provided, which is connected directly to the ducts. Any gas losses due to leakages are in this case compensated in that the reservoir is connected to a vapor line which maintains the pressure in the reservoir. Hydrogen or a mixture of water vapor and of hydrogen could just as well be fed in at this point, since the mixture suitable for the charging state of the store is always set automatically.

The described set-up of the electrical energy store is a technically simple solution, since various levels of the electrical energy store can be placed one above the other, so that what is known as a stack composed of a plurality of storage cells is obtained. This can be placed in a water vapor/hydrogen reservoir in a simple way, so that a complicated supply of this gas to the individual cells can be dispensed with.

In a further advantageous refinement, a stack has a wall, the ducts with the storage medium being accessible by being open toward this wall. The water vapor/hydrogen mixture can thereby pass, for example by diffusion, through the orifices in the stack wall into the ducts if the stack is placed directly in the gas reservoir.

In an advantageous refinement, the electrical energy store has a plurality of stacks which are surrounded, in turn, by a common water vapor/hydrogen reservoir.

In this case, the water vapor/hydrogen reservoir, occupied by one or more stacks, is thermally insulated outwardly. It thus forms what is known as a hot box.

Advantageously, an overpressure, preferably in the hectopascal range (1 hPa-100 hPa), may also be present in the water vapor/hydrogen reservoir. This ensures that there is always sufficient water vapor/hydrogen mixture available for reaction and the inflow or inward diffusion of air from outside the reservoir or the hot box due to leakages, which could adversely influence the reaction with the storage material owing to the introduction of inert nitrogen, is obstructed.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows an exploded illustration of a stack, seen from above, FIG. 3 shows an exploded illustration of the stack from FIG. 2, seen from below, FIG. 4 shows a stack with outwardly open ducts for the storage medium.

DETAILED DESCRIPTION OF THE PREFERRED EMBODIMENT

Figure 1:
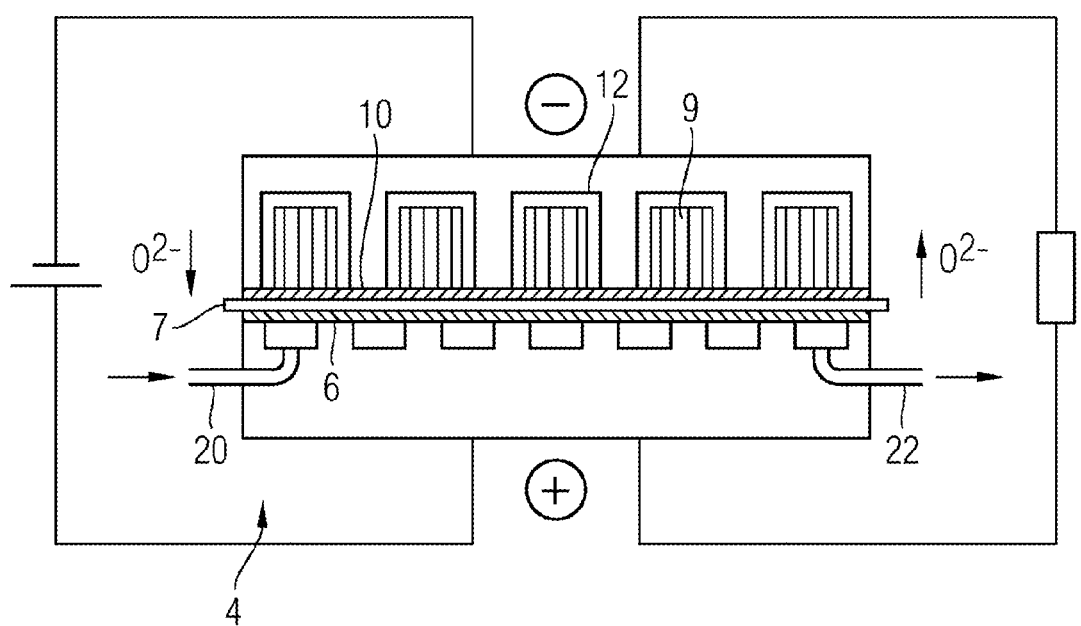
FIG. 1 shows a diagrammatic illustration of a cell of a rechargeable oxide battery.

Reference will now be made in detail to the preferred embodiments of the present invention, examples of which are illustrated in the accompanying drawings, wherein like reference numerals refer to like elements throughout.

The type of action of a rechargeable oxide battery (ROB) will first be described diagrammatically with reference to FIG. 1, in as much as this is necessary for the present description. In a conventional set-up of an ROB, a process gas, in particular air, is injected via a gas supply 20 at a positive electrode 6, which is also designated as an air electrode, oxygen being extracted from the air. The oxygen passes in the form of oxygen ions $O^{2-}$ through a solid electrolyte 7 bearing against the positive electrode, to a negative electrode 10 which, as described, is also designated as a storage electrode. If, then, a dense layer of active storage material were present on the negative electrode 10, that is to say on the storage electrode, the charging capacity of the battery would quickly be exhausted.

For this reason, it is expedient to use on the negative electrode 10, as energy storage medium, a storage medium 9 which is composed of porous material and which contains a functionally acting oxidizable material as an active storage material, preferably in the form of iron and iron oxide.

Via a redox pair, for example $H_2/H_2O$, which is gaseous in the operating state of the battery, the oxygen transported in the form of $O^{2-}$ ions through the solid electrolyte 7 is transported from the negative electrode, leaving behind the electrons, through pore ducts in the porous storage medium 9 into the depth of the active storage material. Depending on whether there is a discharging or a charging operation, the metal or the metal oxide (iron/iron oxide) is oxidized or reduced, and the oxygen required for this purpose is delivered by the gaseous redox pair $H_2/H_2O$ or is transported back to the solid electrolyte 7. This oxygen transport mechanism carried by the gaseous redox pair is designated as a shuttle mechanism.

The advantage of iron as oxidizable material, that is to say as active storage material, is that, during its oxidation process, it has approximately the same off-load voltage of about 1 V as the redox pair $H_2/H_2O$ in the case of a partial pressure ratio of 1, otherwise increased resistance arises to the transport of oxygen by the diffusing components of this redox pair.

One advantage of the ROB is that it can be extended to a virtually unlimited extent in modular form by the repetition of its smallest unit, to be precise the storage cell 4. A small battery for stationary domestic use and a large-scale plant for storing the energy of a power station can thus be produced.

A plurality of the storage cells 4 described in FIG. 1 are combined into what is known as a stack 2. The set-up of a stack 2 and the arrangement of the storage cells 4 in the stack 2 are made clear by the exploded illustrations in FIG. 2 and FIG. 3. FIG. 2 illustrates the set-up of a stack which is seen from above and in this case is assembled in the order from the bottom upward. The stack 2 comprises in the first place a base plate 24 which, if appropriate, is assembled from a plurality of individual plates which, in turn, have functional structurings and depressions, for example, for the routing of air. This assemblage of individual plates, which is not described in any more detail here, to form the base plate 24 is carried out, for example, by a brazing method.

The base plate 24 has an air supply 20 and an air discharge 22. As already described, ducts, not shown here, for air supply are integrated in the base plate 24 as a result of the assemblage of individual plates. Furthermore, the base plate 24 has centering bolts 29, by which further components of the stack 2 can then be attached in a centered manner. The next layer which follows is an electrode structure 25 which, in particular, comprises the already described positive electrode 6, solid electrolytes 7 and storage electrode 10. This is a self-supporting ceramic structure, to which the individual functional regions, such as the electrodes and the solid electrolyte are attached by a thin-film method.

A further layer which follows is a seal 26 which is composed, for example, of a glass frit which is resistant to high temperature and which seals off the individual plates of the stack 2 when the battery is at the operating temperature.

The next following plate is what is known as an interconnector plate 27 which has two functionally acting sides. On its lower side 34, as seen with respect to FIG. 2, are located the air supply ducts, not illustrated in any more detail here, which are adjacent to the positive electrode 6 of a storage cell 4. On its topside (store side), the interconnector plate 27 has ducts 12 into which the storage medium 9 is introduced. The topside of the interconnector plate 27 in FIG. 2 has the same structure as the topside of the base plate 24. Here, too, the ducts 12 for introducing the storage medium 9 are provided. This side having the ducts 12 in each case faces the storage electrode 10 of the storage cell 4.

FIG. 2 illustrates by way of example a further level of the sequence of an electrode structure 25 and a seal 26 under a closing plate 28, to form the overall set-up of the stack 2. In principle, of course, a series of further levels of these structural parts may also follow, so that a stack usually has between 10 and more layers of storage cells 4.

FIG. 3 illustrates the same stack 2, which is described in FIG. 2, in the opposite viewing direction. In FIG. 3, the view is of the base plate 24 from below, followed, in turn, by the electrode structure 25 and the seal 26. The interconnector plate 27 can then likewise be seen from below, the view in this case being directed toward the air side 34 which faces the air electrode (air side 34). In this example, four separate regions are illustrated on the interconnector plate on the air side 34 and correspond to a subdivision into four individual storage cells 4 per stack level (although this subdivision into four storage cells must be considered as being purely by way of example). In this example, therefore, the storage cell 4 is composed of a quarter of the area of the respective interconnector plate or base plate 24 or cover plate 28. Furthermore, the respective cell 4 is formed by a sequence of the respective air side 34, seal 26, electrode structure 25 and again in each case a quarter of the storage side 32 of the base plate 24 or interconnector plate 27. The air side 34 is in this case supplied with air as process gas by a stack-internal air distribution device 8 (also called a manifold) which is not illustrated in any more detail here and comprises a plurality of levels of the stack.

FIG. 4 illustrates a stack 2 according to FIGS. 2 and 3 in its assembled form. The air supply 20 and the air discharge 22 can be seen from outside, and dashed lines illustrate diagrammatically the air distribution device 8 arranged inside. The air distribution device 8 in this case comprises both the air inlet 20, the air outlet 22 and ducts, not designated in any more detail, in the base plate 24 and in the lateral region of the assembled stack 2.

Figure 5:
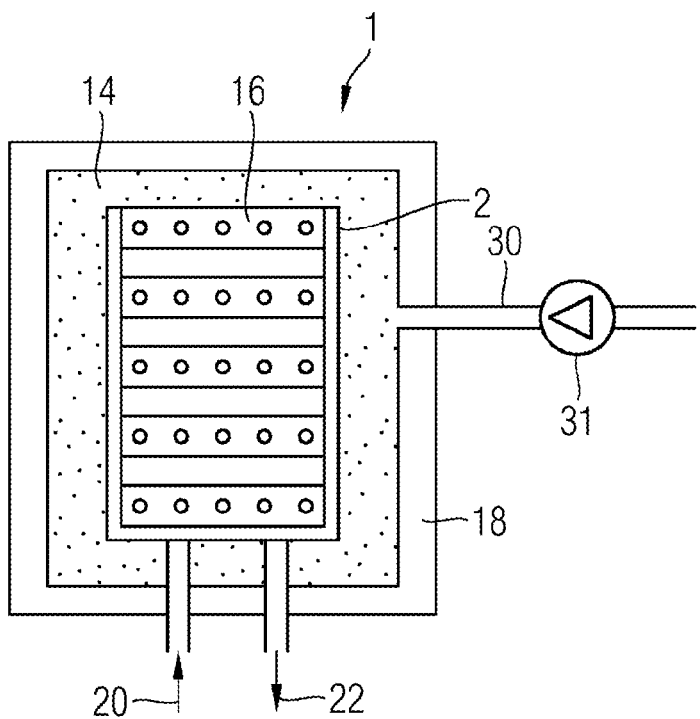
FIG. 5 shows a stack in a gas-tight reservoir filled with water vapor/hydrogen mixture and having thermal insulation.

Arranged separately from these in atmospheric terms are the ducts 12 which are in each case located on the storage side 32 of the base plate 24 or of the interconnector plate 27. As can be seen in more detail in FIG. 5, the storage medium 9 is introduced in the ducts 12. In the embodiment present here, the ducts 12 are accessible by being open with respect to a stack wall 16. Thus, as illustrated diagrammatically in FIG. 5, the stack 2 can be brought into a closed space in which, in turn, an $H_2/H_2O$ atmosphere prevails. This closed space having the $H_2/H_2O$ atmosphere is designated as a reservoir 14. The reservoir 14 in this case preferably has an overpressure of the reaction pair $H_2/H_2O$ of about 1-100 hPa. This ensures that, in the event of possible leakage of the reservoir 14, no nitrogen and oxygen penetrate into the reservoir 14 from outside, but instead, in this case, $H_2/H_2O$ can escape from the reservoir harmlessly, while this loss can be compensated by a current flux and a water vapor supply 30 via a valve 31. It will be possible just as well to supply, instead of pure water vapor, a hydrogen/water vapor mixture or else even pure hydrogen. The overall arrangement according to FIG. 5 with the stack 2 and with the reservoir 14, which is surrounded by thermal insulation 18, which is also designated as what is known as a hot box, is designated as an electrical energy store 1.

Figure 6:
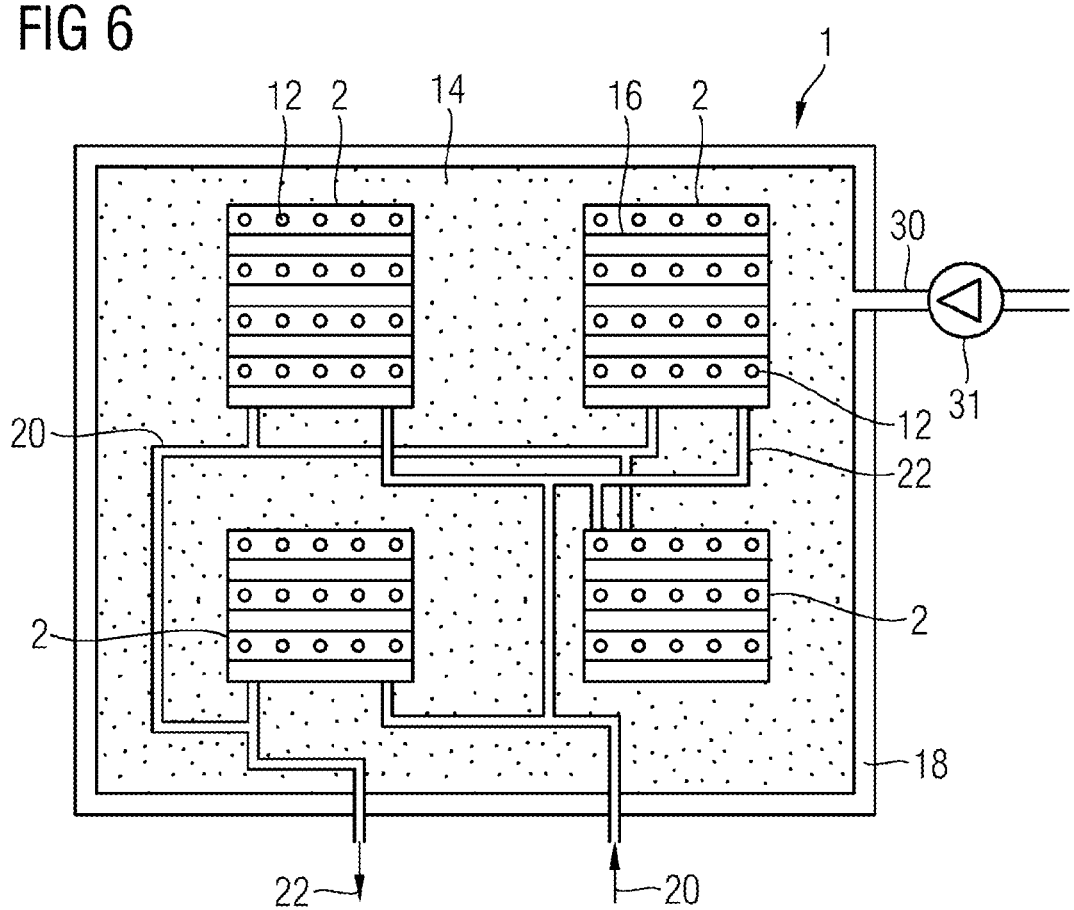
FIG. 6 shows an electrical energy store with four stacks in a water vapor/hydrogen reservoir having thermal insulation.

In this case, even more complex electrical energy stores 1 in which a plurality of stacks 2 are arranged (FIG. 6) are expedient. In this case, a central air supply 20 and a central air discharge 22 may be provided, the individual stacks 2 thereby being supplied with air as process gas by a corresponding line 20. Virtually the operating temperature of the electrical energy store, which usually lies between 600° C. and 800° C., prevails in the hot box 18. In principle, further arrangements for heat storage, for example a latent heat store, which is not illustrated here, may also be arranged in the hot box 18.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An electrical energy store comprising:
    a plurality of stacks of storage cells, each storage cell comprising:
        ducts which contain a storage medium and water vapor;
        an air electrode which is connected to an air supply device; and
        a storage electrode adjacent to the ducts; and
    a reservoir of water vapor which is connected directly to the ducts, the reservoir surrounding the plurality of stacks.

2. The electrical energy store as claimed in claim 1, wherein each stack of storage cells has a stack wall, and the ducts of each storage cell are accessible and open toward the stack wall.

3. The electrical energy store as claimed in claim 2, wherein the reservoir surrounds each stack wall at which the ducts are accessible and open.

4. The electrical energy store as claimed in claim 3, wherein the reservoir surrounds an entirety of each stack.

5. The electrical energy store as claimed in claim 4, wherein the reservoir has an outer boundary, and the outer boundary of the reservoir is thermally insulated.

6. The electrical energy store as claimed in claim 5, wherein the reservoir has a pressure of 1 hPa-100 hPa.

7. The electrical energy store as claimed in claim 1, wherein the reservoir surrounds an entirety of each stack.

8. The electrical energy store as claimed in claim 1, wherein the reservoir has an outer boundary, and the outer boundary of the reservoir is thermally insulated.

9. The electrical energy store as claimed in claim 1, wherein the reservoir has a pressure that is elevated with respect to an ambient pressure.

10. The electrical energy store as claimed in claim 1, wherein the reservoir has a pressure of 1 hPa-100 hPa.

11. The electrical energy store as claimed in claim 1, wherein the reservoir contains a mixture of water vapor and hydrogen gas.

* * * * *